(12) United States Patent
Yanagitani et al.

(10) Patent No.: US 12,392,739 B2
(45) Date of Patent: Aug. 19, 2025

(54) RARE EARTH OXYSULFIDE COLD STORAGE MEDIUM

(71) Applicant: Konoshima Chemical Co., Ltd., Osaka (JP)

(72) Inventors: Takagimi Yanagitani, Mitoyo (JP); Hoshiteru Nozawa, Mitoyo (JP)

(73) Assignee: Konoshima Chemical Co., Ltd., Osaka (JP)

( * ) Notice: Subject to any disclaimer, the term of this patent is extended or adjusted under 35 U.S.C. 154(b) by 340 days.

(21) Appl. No.: 17/573,218

(22) Filed: Jan. 11, 2022

(65) Prior Publication Data

US 2022/0135419 A1  May 5, 2022

Related U.S. Application Data

(62) Division of application No. 16/311,429, filed as application No. PCT/JP2017/024919 on Jul. 7, 2017, now abandoned.

(30) Foreign Application Priority Data

Aug. 5, 2016 (JP) .................................. 2016-155082

(51) Int. Cl.
  *G01N 23/2055*  (2018.01)
  *C01F 17/294*  (2020.01)
  (Continued)

(52) U.S. Cl.
  CPC ........ *G01N 23/2055* (2013.01); *C01F 17/294* (2020.01); *C04B 35/50* (2013.01);
  (Continued)

(58) Field of Classification Search
  CPC ....... G01N 2223/0566; G01N 23/2055; G01N 1/42; G01N 2035/0486; C09K 5/14;
  (Continued)

(56) References Cited

U.S. PATENT DOCUMENTS 3,855,470 A * 12/1974 Sahores ................. G01N 23/20
  378/81
4,752,424 A *  6/1988 Matsuda ............... C04B 35/547
  501/126

(Continued)

FOREIGN PATENT DOCUMENTS

JP  2003-213252 A   7/2003
JP  2004-161839 A   6/2004
  (Continued)

OTHER PUBLICATIONS

International Search Report for PCT/JP2017/024919 dated Aug. 8, 2017.
  (Continued)

*Primary Examiner* — David J Makiya
*Assistant Examiner* — Soorena Kefayati
(74) *Attorney, Agent, or Firm* — Knobbe, Martens, Olson & Bear, LLP

(57) ABSTRACT

A cold storage material having a large thermal capacity in a ultra-low temperature range of 10 K or less and being highly durable against thermal shock and mechanical vibration. The cold storage material contains a rare earth oxysulfide ceramic represented by the general formula $R_2O_2S$ in which R is one or more kinds of rare earth elements selected from La, Ce, Pr, Nd, Sm, Eu, Gd, Tb, Dy, Ho, Er, Tm, Yb, Lu, and Y, and $Al_2O_3$ having a specific surface area of 0.3 $m^2/g$ to 11 $m^2/g$ is added to the cold storage material.

3 Claims, 3 Drawing Sheets

(51) Int. Cl.
  *C04B 35/50* (2006.01)
  *C09K 5/14* (2006.01)
  *F25B 9/14* (2006.01)

(52) U.S. Cl.
  CPC .......... *C04B 2235/3217* (2013.01); *C04B 2235/446* (2013.01); *C04B 2235/9607* (2013.01); *C09K 5/14* (2013.01); *F25B 9/14* (2013.01); *F25B 2309/003* (2013.01); *G01N 2223/0566* (2013.01)

(58) Field of Classification Search
  CPC ...... C04B 2235/3217; C04B 2235/446; C04B 2235/9607; C04B 35/50; C01P 2002/50; C01P 2002/52; C01P 2002/54; C01P 2002/72; C01P 2004/03; C01P 2004/61; C01F 17/294; C01F 17/00; F25B 9/14
  See application file for complete search history.

(56) References Cited

U.S. PATENT DOCUMENTS

| | | | | |
|---|---|---|---|---|
| 5,530,732 | A * | 6/1996 | Takemi | G01N 23/20 378/71 |
| 6,467,277 | B2 * | 10/2002 | Okamura | F25B 9/14 165/4 |
| 7,226,543 | B2 * | 6/2007 | Takagimi | H01F 1/017 165/4 |
| 7,291,381 | B2 * | 11/2007 | Tobita | C04B 35/83 264/437 |
| 7,404,295 | B2 | 7/2008 | Li et al. | |
| 8,389,751 | B2 | 3/2013 | Zhang et al. | |
| 2002/0182140 | A1 * | 12/2002 | Kijima | C09K 11/08 423/512.1 |
| 2003/0209694 | A1 * | 11/2003 | Holloway | C01F 17/294 252/301.4 S |
| 2004/0013593 | A1 * | 1/2004 | Takagimi | H01F 1/017 423/263 |
| 2004/0131152 | A1 * | 7/2004 | Bates | G01N 23/20 378/70 |
| 2005/0223714 | A1 * | 10/2005 | Li | F25B 9/145 62/6 |
| 2007/0104629 | A1 * | 5/2007 | Yadav | C01F 17/229 977/773 |
| 2010/0032611 | A1 * | 2/2010 | Fukuhara | C08L 67/02 252/70 |
| 2011/0174989 | A1 * | 7/2011 | Bayya | C04B 35/62665 977/775 |
| 2012/0145962 | A1 * | 6/2012 | Fukuta | C09K 11/7774 252/301.4 R |
| 2015/0210911 | A1 * | 7/2015 | Yamada | B22F 9/08 62/51.1 |
| 2016/0230085 | A1 * | 8/2016 | Terazawa | C01F 17/294 |
| 2016/0251573 | A1 * | 9/2016 | Terazawa | C04B 35/5156 252/301.4 S |
| 2017/0200956 | A1 * | 7/2017 | Nagami | H01M 4/926 |
| 2017/0305751 | A1 * | 10/2017 | Casci | B01J 29/83 |

FOREIGN PATENT DOCUMENTS

| | | |
|---|---|---|
| JP | 3642486 B2 | 2/2005 |
| JP | 2005-336240 A | 12/2005 |
| JP | 2007-223880 A | 9/2007 |
| JP | 4030091 B2 | 10/2007 |
| WO | WO 03/081145 A1 | 10/2003 |

OTHER PUBLICATIONS

International Preliminary Report on Patentability for PCT/JP2017/024919 dated Feb. 5, 2019.

\* cited by examiner

[Fig. 1]

RARE EARTH OXYSULFIDE COLD STORAGE MEDIUM

RELATED APPLICATIONS

This application is a divisional of U.S. patent application Ser. No. 16/311,429, filed Dec. 19, 2018, which is the U.S. National Phase Application filed under 35 U.S.C. § 371 of International Application PCT/JP2017/024919, filed Jul. 7, 2017, designating the United States and published in Japanese and, which claims priority to Japanese Patent Application No. 2016-155082, filed Aug. 5, 2016, the entire contents of the aforementioned applications are incorporated herein by reference.

TECHNICAL FIELD

The present invention relates to a cold storage material containing a rare earth oxysulfide ceramic represented by the general formula $R_2O_2S$ (wherein R is one or more kinds of rare earth elements selected from La, Ce, Pr, Nd, Sm, Eu, Gd, Tb, Dy, Ho, Er, Tm, Yb, Lu, and Y), and in particular, relates to a cold storage material which is resistant to wearing even in prolonged operation of a refrigerator.

BACKGROUND ART

Liquid helium is indispensable for cooling a superconducting magnet, a sensor, etc., and liquefying helium gas requires a huge work of compression by cooling with a large refrigerator. However, it is difficult to install a large refrigerator in a small device using superconductivity, such as a magnetic levitation system and a MRI (magnetic resonance imaging) system. Therefore, it is essential to develop a smaller and more lightweight refrigerator having an excellent thermal efficiency and being capable of reaching liquid helium temperature (4.2 K). A GM refrigerator (a small helium refrigerator of Gifford-McMahon type) used for a superconducting MRI system etc. comprises, for example, a compressor for compressing a working medium, such as He gas, an expansion space for expanding the compressed working medium, and a cryogenic regenerator for maintaining the cool state of the working medium cooled in the expansion space. In the GM refrigerator, the working medium compressed by the compressor is expanded at, for example, about 60 cycles/min and cooled, and the cooled working medium cools the system through the end of the expansion space of the refrigerator.

The cooling capacity and the possible lowest temperature of a small refrigerator depend on the cold storage material contained in the refrigerator, and the cold storage material needs to have a large heat capacity and a high heat-exchange efficiency. The heat capacity of a conventional metal cold storage material, such as Pb, falls rapidly at a low temperature of 10 K or less. To address the problem, rare earth intermetallic compound-based cold storage materials having a large heat capacity at about liquid helium temperature (4.2 K), such as $HoCu_2$ and ErNi, were developed (Japanese Patent No. 2609747). However, the heat capacity of such a rare earth intermetallic compound-based cold storage material significantly falls at 7 K or less, and becomes less than 0.3 J/cc·K in a ultra-low temperature range around 4.2 K. To maintain sufficient refrigerating capacity in the ultra-low temperature range, the heat capacity of the cold storage material should be 0.3 J/cc·K or higher at the temperature. Therefore, the refrigerating capacity of the rare earth intermetallic compound-based cold storage materials, such as $HoCu_2$ and ErNi, is insufficient. In addition, rare earth intermetallic compounds are extremely expensive, and regenerators using the rare earth intermetallic compounds in the order of hundreds of grams are also extremely expensive.

In these circumstances, the inventors found cold storage materials based on an oxysulfide ceramic represented by the formula $R_2O_2S$ (wherein R is one or more kinds of rare earth elements selected from La, Ce, Pr, Nd, Sm, Eu, Gd, Tb, Dy, Ho, Er, Tm, Yb, Lu, and Y) having a high heat capacity in a ultra-low temperature range of 10 K or less, and confirmed that a regenerator using the cold storage material achieves a high refrigerating capacity even in a ultra-low-temperature around 4.2 K (Patent Literature 1 and 2). However, the cold storage materials described in Patent Literature 1 may be broken by 1000 hours of continuous operation, and Patent Literature 2 describes that about 1500 hours of continuous operation of a GM refrigerator caused breakage or wearing in the cold storage materials, resulting in drastic reduction in the refrigerating capacity of the refrigerator.

CITATION LIST

Patent Literature

Patent Literature 1: Japanese Patent No. 3642486
Patent Literature 2: Japanese Patent No. 4030091

SUMMARY OF INVENTION

Technical Problem

An object of the present invention is to provide a ceramic cold storage material having a large thermal capacity in a ultra-low temperature range of 10 K or less and being highly durable against thermal shock and mechanical vibration.

Solution to Problem

The rare earth oxysulfide-based cold storage material of the present invention is a cold storage material containing a rare earth oxysulfide ceramic represented by the general formula $R_2O_2S$ (wherein R is one or more kinds of rare earth elements selected from La, Ce, Pr, Nd, Sm, Eu, Gd, Tb, Dy, Ho, Er, Tm, Yb, Lu, and Y), the rare earth oxysulfide-based cold storage material comprising $Al_2O_3$ added thereto in an amount of 3 to 12% by weight in terms of aluminum.

The specific surface area of the $Al_2O_3$ is preferably 0.3 $m^2/g$ to 11 $m^2/g$.

The rare earth oxysulfide-based cold storage material of the present invention may be charged in a regenerator. The regenerator in the present invention may be referred to as a cold storage device or a cold storage apparatus, and the regenerator of the present invention has a meaning including such a cold storage device, a cold storage apparatus, etc.

To produce the rare earth oxysulfide-based cold storage material of the present invention, for example, $Al_2O_3$ in an amount of 3 to 12% by weight in terms of aluminum is added to a powder of a compound of the general formula $R_2O_2S$, and the mixture is formed into grains, for example. Alternatively, a powder or the like of the above additive is added to a rare earth oxide powder as a raw material, which is then allowed to react with a flowing gas of $H_2S$, $CH_3SH$, or the like comprising sulfur atoms with oxidation number −2 under heating to give an oxysulfide, and the mixture is formed into grains, for example. Subsequently, the grains or the like are sintered, for example at 1400 to 1600° C. for 1 to 10 hours. The relative density of the resulting rare earth oxysulfide-based cold storage material is 98% or more, and the average crystal size is 20 μm or less.

For example, $Al_2O_3$ is added to a commercial rare earth oxide powder and mixed using a grinder, such as a ball mill. The mixed powder after the addition is calcined at about 800 to 1100° C., then placed in a reaction tube made of quartz or the like, and then sulfurized using a flowing gas of $H_2S$, $CH_3SH$, or the like comprising sulfur atoms with oxidation number −2 under heating to give the intended rare earth oxysulfide powder.

Alternatively, it is allowable that a rare earth oxide powder is sulfurized first and then $Al_2O_3$ is mixed therewith. The conditions for the sulfurization depend on the specific surface area of the rare earth oxide powder, but in cases of a rare earth oxide powder of which the specific surface area is, for example, about 4 $m^2/g$, 500 to 800° C. is preferable, and 600 to 700° C. is more preferable. When the temperature is less than 500° C., some unreacted powder remains, and when the temperature is higher than 800° C., not the oxysulfide but mere the sulfide will be produced. The reaction time is preferably 1 to 9 hours, and more preferably 1 to 3 hours.

In cases where the raw material powder obtained as above is formed into grains, the powder is preferably granulated into ball-shaped grains by, for example, tumbling granulation, a combination of extrusion granulation and tumbling granulation, fluid bed granulation, spray drying, compacting, etc. Alternatively, it is allowable that the mixed powder is granulated into ball-shaped grains beforehand as above and then sulfurization is performed. The sulfuration conditions are the same as above.

The formed product produced as above is sintered under vacuum ($10^{-3}$ Torr or less) or in an atmosphere of an inert gas, such as argon, nitrogen, etc. in order not to be oxidized. The sintering temperature is preferably 1400 to 1600° C., and the sintering time is preferably 1 to 10 hours. In the cases of grains, the average grain size is preferably within the range of 0.05 to 1 mm.

Advantageous Effects of Invention

The magnetic phase transition temperature of the rare earth oxysulfide-based cold storage material of the invention comprising $Al_2O_3$ added thereto is similar to that of a rare earth oxysulfide-based cold storage material without the addition of $Al_2O_3$, and the heat capacity is 0.3 J/cc·K or higher at a desired temperature within a relatively wide temperature range of 10 K or lower. The rare earth oxysulfide-based cold storage material of the invention comprises $Al_2O_3$ in addition to the $R_2O_2S$ phase as the main phase. The $Al_2O_3$ forms a second phase having a different composition from that of the main phase and suppresses the growth of crystal grains of the main phase. The suppression of the crystal grain growth and the relatively greater strength of the second phase comprised in a certain amount or more result in increased strength. Since $Al_2O_3$ is a material of greater strength as compared to $R_2O_2S$ as the main phase, when 3% by weight or more of $Al_2O_3$ in terms of aluminum is added, no grain breakage is observed even after, for example, 10000 hours of continuous operation of a GM refrigerator. In contrast, in cases of a rare earth oxysulfide ($R_2O_2S$)-based cold storage material without the addition of the $Al_2O_3$ as described herein, breakage or wearing of the grains is observed after 1500 hours of continuous operation of a GM refrigerator.

A rare earth oxysulfide-based cold storage material comprising the $Al_2O_3$ as described herein in an amount of less than 3% by weight in terms of aluminum has a problem of lacking grain durability required for the operation of a refrigerator over a long period of time. Meanwhile, when the $Al_2O_3$ as described herein in an amount of more than 12% by weight in terms of aluminum is added, the specific heat capacity of the cold storage material decreases due to the heat capacity of the second phase.

In this invention, by the addition of $Al_2O_3$, a second phase is formed in addition to the $R_2O_2S$ phase as the main phase, and thereby the growth of crystal grains of the main phase is suppressed, giving a high-strength rare earth oxysulfide-based cold storage material. As a result, even when a refrigerator is operated for a long period of time, the grains of the cold storage material are not broken, and the sealing part or the like of the refrigerator is not damaged. The magnetic phase transition temperature of the rare earth oxysulfide-based cold storage material comprising $Al_2O_3$ added thereto in an amount of 3 to 12% by weight in terms of aluminum is similar to that of a rare earth oxysulfide-based cold storage material without the addition of $Al_2O_3$, but the heat capacity decreases with the increase of the added amount. However, a heat capacity of 0.3 J/cc·K or higher at a desired temperature is sufficient for the cooling performance of the refrigerator, and therefore, an added amount of 12% or less by weight will cause no problem.

$Al_2O_3$, which is a material of higher strength as compared to the $R_2O_2S$ as the main phase, is preferably present as much as possible in the cold storage material to make the cold storage material highly durable against thermal shock and mechanical vibration. However, in the sintering of the formed product of the $R_2O_2S$ comprising $Al_2O_3$ in a reducing atmosphere, the added $Al_2O_3$ reacts with the $R_2O_2S$, resulting in a decreased amount of the $Al_2O_3$ present after the reaction. For example, in cases where the $R_2O_2S$ is $Gd_2O_2S$, the $Al_2O_3$ reacts with the $Gd_2O_2S$ under the reducing atmosphere, and partly changes into $GdAlO_3$ as shown in the right-hand side of the following formula (1).

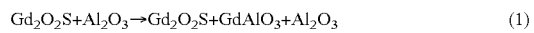

$$Gd_2O_2S+Al_2O_3 \rightarrow Gd_2O_2S+GdAlO_3+Al_2O_3 \qquad (1)$$

In this case, as the specific surface area of the added $Al_2O_3$ increases, the reactivity with the $Gd_2O_2S$ increases, and the amount of the $Al_2O_3$ present after the reaction decreases. As a result, the $Al_2O_3$ as a reinforcing material becomes less effective. Therefore, the specific surface area of the $Al_2O_3$ added to the $R_2O_2S$ is preferably 11 $m^2/g$ or less.

Meanwhile, as the specific surface area of the added $Al_2O_3$ decreases, the reactivity with the $Gd_2O_2S$ decreases. However, a smaller specific surface area also means a relatively larger $Al_2O_3$ grain size. When the raw material powder of the cold storage material of the present invention is formed into grains and then sintered, too large $Al_2O_3$ grain size inhibits sintering and decreases the strength of the grains. Therefore, the specific surface area of the $Al_2O_3$ added to the $R_2O_2S$ is preferably 0.3 $m^2/g$ or more.

DESCRIPTION OF EMBODIMENTS

Figure 1:
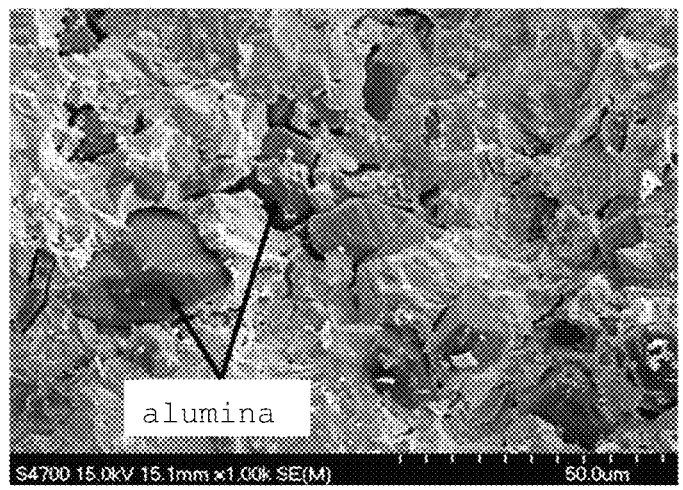
FIG. 1 shows a scanning electron microscope (SEM) image (×1000) of a fractured surface of an Al-doped $Gd_2O_2S$ cold storage material.

Hereinafter, preferred embodiments of the present invention will be described based on specific examples, but it is needless to say that the present invention is not limited to the examples described below and various alterations and modifications may be made without departing from the technical scope of the invention.

EXAMPLES

Test Example 1

Into a quartz boat was charged 10 g of gadolinium oxide ($Gd_2O_3$) having an average grain size of 0.46 μm (with a specific surface area of 4.2 m$^2$/g) measured by the Fisher method, which was then subjected to a reaction with hydrogen sulfide ($H_2S$) gas passed through a quartz reaction tube at a flow rate of 0.2 L/min at 650° C. for 4 hours. The reaction product was measured by X-ray diffraction, in which peaks of gadolinium oxysulfide ($Gd_2O_2S$) were solely observed, showing that the yield of the reaction with the rare earth oxide was 100%. The obtained $Gd_2O_2S$ powder was formed into a disk-like shape 12 mm in diameter at a pressure of 30 MPa. The formed product was subjected to isostatic pressing at 200 MPa, followed by pressureless sintering at 1500° C. for 6 hours under argon atmosphere. The heating rate was 200° C./h.

The density of the resulting $Gd_2O_2S$ ceramic determined by the Archimedes method was 99.9% relative to the theoretical density, and the average crystal size calculated using the following formula was 3.2 μm.

$$d = 1.56 \, C/(MN)$$

(d: average grain size, C: the length of an arbitrarily placed line on a high-resolution image by SEM or the like, N: the number of grains intercepted by the line, M: magnification of the image)

The obtained $Gd_2O_2S$ ceramic had a magnetic phase transition temperature of about 5 K and a heat capacity of 1.2 J/cc·K at the magnetic phase transition temperature. The heat capacity around the liquid helium temperature was 3 to 5 times as compared to that of conventional cold storage materials of $HoCu_2$, $ErNi$, etc., and thus the usability of the $Gd_2O_2S$ ceramic as a cold storage material at about 4.2 K was confirmed.

Example 1

In a ball mill, placed were the gadolinium oxide used in Test Example 1 and an alumina having a specific surface area of 0.1 to 14 m$^2$/g measured by the BET single point adsorption method using $N_2$ gas in accordance with JIS Z 8830:2013, which were mixed using ethanol as a solvent for 24 hours. The resulting slurry was dried, and calcined (900° C. for 3 hours). The resulting product was reacted with hydrogen sulfide gas, and through a procedure as in Test Example 1 (formed into a disk-like shape 12 mm in diameter at a pressure of 30 MPa, the formed product was subjected to isostatic pressing at 200 MPa, followed by pressureless sintering at 1500° C. for 6 hours under argon atmosphere), a $Gd_2O_2S$ ceramic comprising Al (Al-doped $Gd_2O_2S$) was prepared. The density of the resulting Al-doped $Gd_2O_2S$ ceramic determined by the Archimedes method was 99.9% relative to the theoretical density. To determine the composition ratio of $Gd_2O_2S$, $GdAlO_3$, and $Al_2O_3$ in the thus prepared Al-doped $Gd_2O_2S$, ground and polished samples were subjected to X-ray diffraction to measure the X-ray intensity at each angle of diffraction (2θ). Taking the X-ray intensity of the principal component $Gd_2O_2S$ at a diffraction angle (2θ) of 29.909° as 100, the proportion (%) of the X-ray intensity of $GdAlO_3$ at a diffraction angle (2θ) of 33.989° relative to the X-ray intensity of $Gd_2O_2S$ was determined. Also, the proportion (%) of the X-ray intensity of $Al_2O_3$ at a diffraction angle (2θ) of =35.152° relative to the X-ray intensity of $Gd_2O_2S$ was determined. The results are shown in Tables 1 to 5. A total of 5 samples were prepared by varying the amount of alumina added, i.e., 3% by weight, 5% by weight, 7% by weight, 10% by weight, and 12% by weight in terms of aluminum, relative to the amount of $Gd_2O_2S$. Table 1 shows the cases where the amount of the added alumina was 3% by weight in terms of aluminum. Table 2 shows the cases where the amount of the added alumina was 5% by weight in terms of aluminum. Table 3 shows the cases where the amount of the added alumina was 7% by weight in terms of aluminum. Table 4 shows the cases where the amount of the added alumina was 10% by weight in terms of aluminum. Table 5 shows the cases where the amount of the added alumina was 12% by weight in terms of aluminum.

Example 2

The Al-doped $Gd_2O_2S$ powder (after sulfuration and before sintering) shown in Example 1 was formed into a ball shape by tumbling granulation, and the obtained grains were sieved using two kinds of mesh filters, i.e., Mesh A (aperture: 597 μm) and Mesh B (aperture: 435 μm). The sieved grains were rolled on a mirror-polished iron plate tilted at an angle of about 25°. The grains that rolled and slid were collected, i.e., shape separation was performed. The average grain size of 100 grains was 0.5 mm. The average grain size of the Al-doped $Gd_2O_2S$ grains was determined based on images taken using a microscope video system.

The obtained Al-doped $Gd_2O_2S$ grains were charged into a crucible made of alumina, and the crucible was placed in a firing furnace. After thorough vacuum deaeration, argon gas was introduced into the furnace, and pressureless sintering was performed in argon atmosphere. Sintering at 1500° C. for 6 hours gave an Al-doped $Gd_2O_2S$ cold storage material in the form of grains having an average grain size of 0.4 mm and an average aspect ratio of 1.1. The average grain size and the average aspect ratio of the Al-doped $Gd_2O_2S$ grains were determined based on microscope video images.

Observation of the degree of destruction of the Al-doped $Gd_2O_2S$ cold storage material obtained as above was carried out as follows. First, a nylon-based medium and an alumina slurry at a concentration of 10% by weight were put into a work tank. To this, the Al-doped $Gd_2O_2S$ cold storage material was added, and surface treatment was performed by rotary barrel processing. The thus-obtained Al-doped $Gd_2O_2S$ cold storage material was charged into a vessel for vibration test (a cylindrical body 20 mm in diameter and 14 mm in height). To the vessel, simple harmonic motion in which the maximum acceleration was 300 m/s$^2$ was applied $1 \times 10^6$ times, and then the degree of destruction of the Al-doped $Gd_2O_2S$ cold storage material was observed. In the above vibration test, if the maximum acceleration is less than 300 m/s$^2$, most Al-doped $Gd_2O_2S$ cold storage materials are not broken, and the degree of destruction cannot be evaluated. Also, if the number of times the simple harmonic motion in which the maximum acceleration is 300 m/s$^2$ is applied is less than $1 \times 10^6$ times, the load is supposed to be less than that on the Al-doped $Gd_2O_2S$ cold storage material used in a regenerator of an actual refrigerator in operation, and therefore, reliable observation results of the degree of destruction cannot be obtained. The results of observation by the naked eye regarding the degree of destruction of the Al-doped $Gd_2O_2S$ cold storage material in the above vibration test are shown in the tables below. Table 1 shows the cases where the amount of the added alumina was 3% by weight in terms of aluminum. Table 2 shows the cases where the amount of the added alumina was 5% by weight in terms of aluminum. Table 3 shows the cases where the amount of the added alumina was 7% by weight in terms of aluminum. Table 4 shows the cases where the amount of the added alumina was 10% by weight in terms of aluminum. Table 5 shows the cases where the amount of the added alumina was 12% by weight in terms of aluminum.

TABLE 1

| Specific surface area of alumina (m$^2$/g) | Relative X-ray intensity of $GdAlO_3$ (%) | Relative X-ray intensity of $Al_2O_3$ (%) | Degree of destruction |
|---|---|---|---|
| 0.1 | 0 | 2.1 | about 10% was broken |
| 0.3 | 0.6 | 1.7 | not broken |
| 0.5 | 0.8 | 1.5 | not broken |
| 1.0 | 1.4 | 1.2 | not broken |
| 4.5 | 2.1 | 1.0 | not broken |
| 6.1 | 3.2 | 0.7 | not broken |
| 7.2 | 4.2 | 0.5 | not broken |
| 11.0 | 9.8 | 0 | about 5% was broken |
| 14.0 | 22.0 | 0 | about 5% was broken |

TABLE 2

| Specific surface area of alumina (m$^2$/g) | Relative X-ray intensity of $GdAlO_3$ (%) | Relative X-ray intensity of $Al_2O_3$ (%) | Degree of destruction |
|---|---|---|---|
| 0.1 | 0 | 2.7 | about 10% was broken |
| 0.3 | 1.1 | 2.3 | not broken |
| 0.5 | 1.3 | 2.1 | not broken |
| 1.0 | 2.7 | 1.5 | not broken |
| 4.5 | 3.3 | 1.2 | not broken |
| 6.1 | 4.7 | 1.0 | not broken |
| 7.2 | 6.6 | 0.8 | not broken |
| 11.0 | 14.0 | 0 | about 5% was broken |
| 14.0 | 39.0 | 0 | about 5% was broken |

TABLE 3

| Specific surface area of alumina (m$^2$/g) | Relative X-ray intensity of $GdAlO_3$ (%) | Relative X-ray intensity of $Al_2O_3$ (%) | Degree of destruction |
|---|---|---|---|
| 0.1 | 0 | 3.8 | about 10% was broken |
| 0.3 | 1.5 | 3.3 | not broken |
| 0.5 | 1.9 | 3.0 | not broken |
| 1.0 | 4.0 | 2.2 | not broken |
| 4.5 | 5.3 | 1.8 | not broken |
| 6.1 | 6.8 | 1.5 | not broken |
| 7.2 | 11.0 | 1.2 | not broken |
| 11.0 | 21.0 | 0.5 | not broken |
| 14.0 | 56.0 | 0 | about 5% was broken |

TABLE 4

| Specific surface area of alumina (m²/g) | Relative X-ray intensity of GdAlO₃ (%) | Relative X-ray intensity of Al₂O₃ (%) | Degree of destruction |
| --- | --- | --- | --- |
| 0.1 | 0.5 | 5.5 | about 10% was broken |
| 0.3 | 2.0 | 4.9 | not broken |
| 0.5 | 2.8 | 4.3 | not broken |
| 1.0 | 5.9 | 3.3 | not broken |
| 4.5 | 8.3 | 2.7 | not broken |
| 6.1 | 10.0 | 2.1 | not broken |
| 7.2 | 17.0 | 1.9 | not broken |
| 11.0 | 32.0 | 1.1 | not broken |
| 14.0 | 82.0 | 0 | about 5% was broken |

TABLE 5

| Specific surface area of alumina (m²/g) | Relative X-ray intensity of GdAlO₃ (%) | Relative X-ray intensity of Al₂O₃ (%) | Degree of destruction |
| --- | --- | --- | --- |
| 0.1 | 0.9 | 6.6 | about 10% was broken |
| 0.3 | 2.4 | 5.9 | not broken |
| 0.5 | 3.4 | 5.2 | not broken |
| 1.0 | 7.2 | 4.0 | not broken |
| 4.5 | 10.0 | 3.3 | not broken |
| 6.1 | 12.0 | 2.7 | not broken |
| 7.2 | 21.0 | 2.4 | not broken |
| 11.0 | 38.0 | 1.2 | not broken |
| 14.0 | 91.0 | 0 | about 5% was broken |

As shown in Tables 1 to 5, in cases where the specific surface area of the alumina was 0.1 m²/g, about 10% of the Al-doped $Gd_2O_2S$ cold storage material was destructed. A fractured surface of the cold storage material comprising 10% by weight of the alumina having a specific surface area of 0.1 m²/g added thereto was observed using a scanning electron microscope (SEM). As shown in FIG. 1, many gaps are present between the alumina grains and the $Gd_2O_2S$ phase, and therefore, the destruction of the Al-doped $Gd_2O_2S$ cold storage material is considered to be attributable to sintering inhibition due to the alumina grains. To prevent such sintering inhibition, the specific surface area of the alumina is preferably not too small, and considering from the results shown in Tables 1 to 5, the specific surface area of the alumina is preferably 0.3 m²/g or more.

Figure 2:
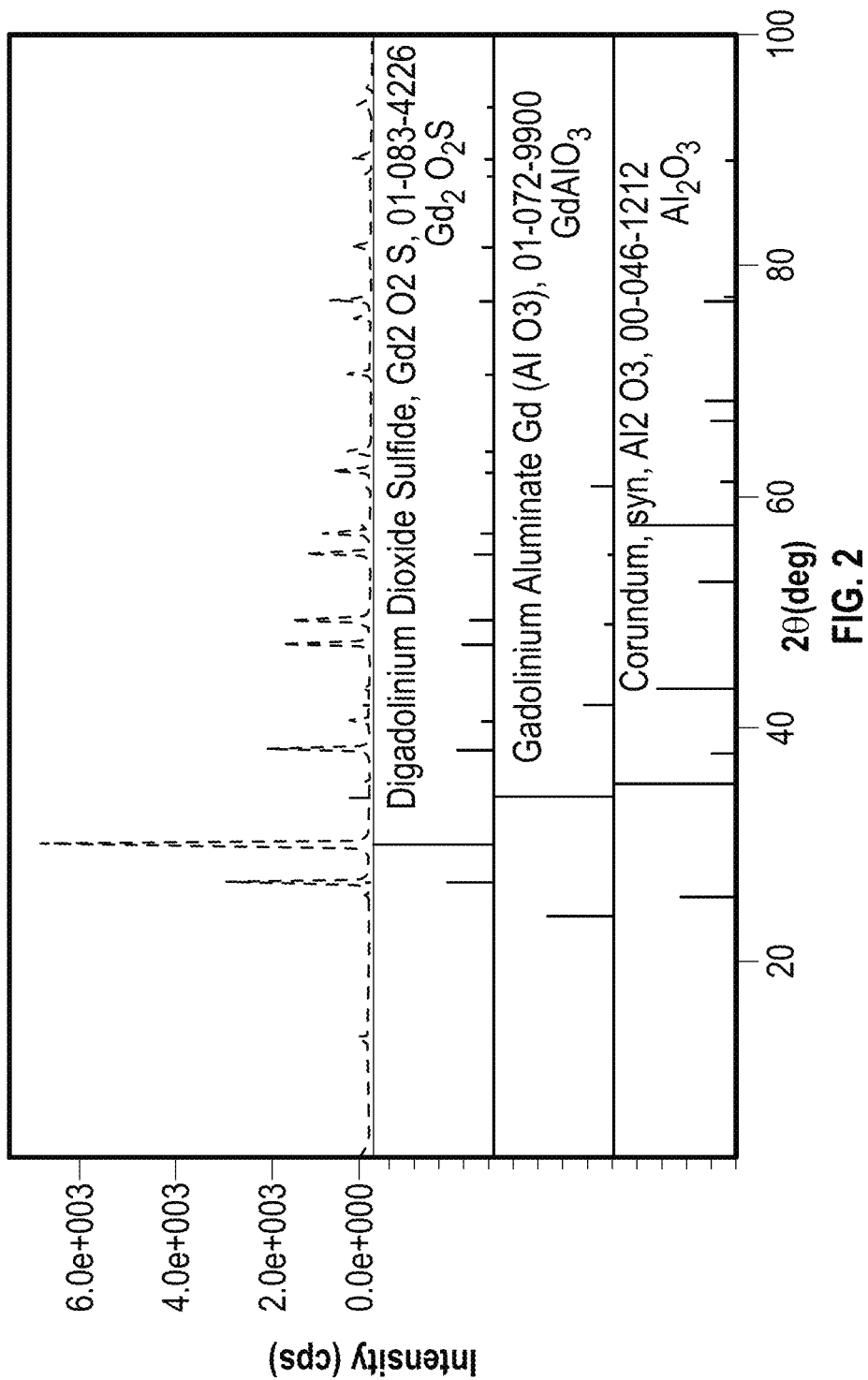
FIG. 2 shows a graph illustrating the results of X-ray diffraction of $Gd_2O_2S$, $GdAlO_3$ and $Al_2O_3$ in which the amount of alumina is 10% by weight in terms of aluminum, and the specific surface area of alumina was 4.5 ($m^2/g$). The top diffraction pattern shows the result of X-ray diffraction in which the X-ray intensity (in cps) is shown on the x-axis, and the diffraction angle (2θ) is shown in the y-axis. The other diffraction patterns show known databases of $Gd_2O_2S$, $GdAlO_3$ and $Al_2O_3$.
Figure 3:
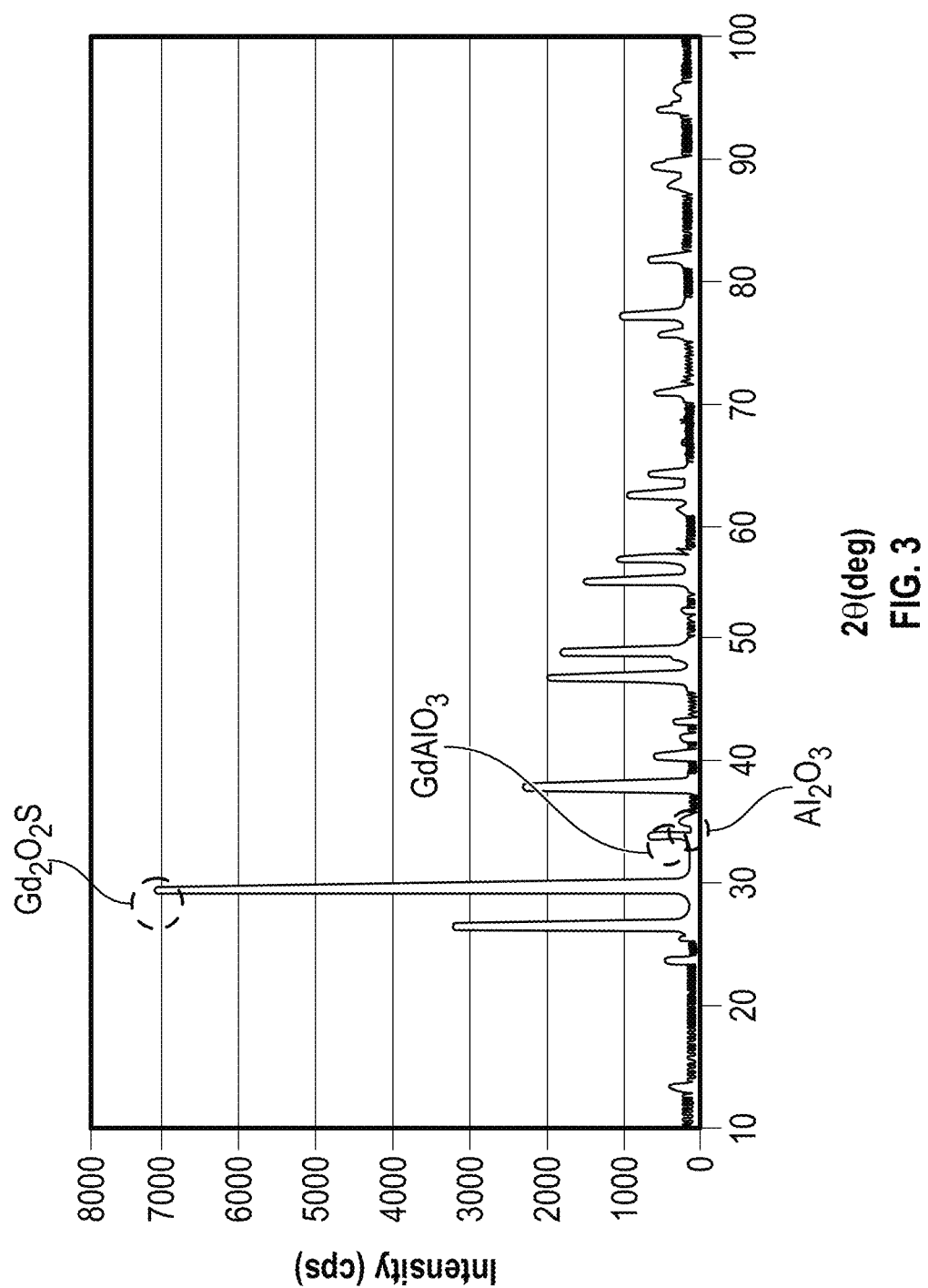
FIG. 3 shows the result of X-ray diffraction obtained by comparing the four diffraction patterns in FIG. 2 in which the X-ray intensity (in cps) is shown on the x-axis, and the diffraction angle (2θ) is shown in the y-axis.

In cases where the amount of the added alumina having a specific surface area of 11 m²/g was 3% by weight and 5% by weight in terms of aluminum, about 5% of the Al-doped $Gd_2O_2S$ cold storage material was destructed, and in cases where the amount of the added alumina having a specific surface area of 14 m²/g was 7% by weight, 10% by weight, and 12% by weight in terms of aluminum, about 5% of the Al-doped $Gd_2O_2S$ cold storage material was destructed. Considering that the relative X-ray intensity of $Al_2O_3$ at the specific surface area of alumina of 11.0 m²/g is 0 in Tables 1 and 2, and the relative X-ray intensity of $Al_2O_3$ at the specific surface area of alumina of 14.0 m²/g is 0 in Tables 3, 4, and 5, the destruction is considered to be attributable to the insufficient amount of alumina as a strength-imparting material in the Al-doped $Gd_2O_2S$ cold storage material. The X-ray diffraction of $Gd_2O_2S$, $GdAlO_3$ and $Al_2O_3$ in which the amount of alumina is 10% by weight in terms of aluminum, and the specific surface area of alumina was 4.5 (m²/g) is shown in the top line of FIG. 2. The other diffraction patterns show known databases of $Gd_2O_2S$, $GdAlO_3$ and $Al_2O_3$. The result of X-ray diffraction obtained by comparing the four diffraction patterns in FIG. 2 is shown in FIG. 3.

Also, comparison of Tables 1 and 2 with Tables 3, 4, and 5 shows the following: in cases where an increased amount of alumina is added, the amount of alumina remaining after the reaction with $Gd_2O_2S$ is also increased as compared to the cases where less alumina is added, and destruction is less likely to occur even when the specific surface area of the alumina is increased.

The invention claimed is:

1. A method for estimating a ratio of $GdAlO_3$ to $Gd_2O_2S$ and a ratio of $Al_2O_3$ to $Gd_2O_2S$ by an X-ray intensity, wherein $Al_2O_3$ reacts with $Gd_2O_2S$ to obtain $Gd_2O_2S$, $Al_2O_3$ and $GdAlO_3$ as a composition, the method comprising:
a first step of obtaining an X-ray intensity of $Gd_2O_2S$ at a diffraction angle (2θ) of 29.909°;
a second step of obtaining an X-ray intensity of $GdAlO_3$ at a diffraction angle (2θ) of 33.989°;
a third step of obtaining an X-ray intensity of $Al_2O_3$ at a diffraction angle (2θ) of 35.152°;
a fourth step of obtaining a first relative X-ray intensity, and the first relative X-ray intensity is a proportion (%) of the X-ray intensity of $GdAlO_3$ obtained by the second step relative to the X-ray intensity of $Gd_2O_2S$ obtained by the first step;
a fifth step of obtaining a second relative X-ray intensity, and the second relative X-ray intensity is a proportion (%) of the X-ray intensity of $Al_2O_3$ obtained by the third step relative to the X-ray intensity of $Gd_2O_2S$ obtained by the first step,
a sixth step of estimating the ratio of $GdAlO_3$ to $Gd_2O_2S$ obtained by the first relative X-ray intensity, and
a seventh step of estimating the ratio of $Al_2O_3$ to $Gd_2O_2S$ obtained by the second relative X-ray intensity.

2. The method according to claim 1, wherein $Al_2O_3$ in an amount of 3 to 12% by weight in terms of aluminum reacts with $Gd_2O_2S$.

3. The method according to claim 2, wherein the first relative X-ray intensity is within a range of 0.6 to 38.0, and the second relative X-ray intensity is within a range of 0.5 to 5.9.

* * * * *